(12) United States Patent
Chaudhary et al.

(10) Patent No.: US 12,237,872 B2
(45) Date of Patent: Feb. 25, 2025

(54) TIME-OF-FLIGHT BASED UNIFIED POSITIONING SYSTEM AND METHODS

(71) Applicant: ECOLE ROYALE MILITAIRE—KONINKLIJKE MILITAIRE SCHOOL, Brussels (BE)

(72) Inventors: Hafeez M. Chaudhary, Brussels (BE); Bart Scheers, Rumst (BE)

(73) Assignee: ECOLE ROYALE MILITAIRE—KONINKLIJKE MILITAIRE SCHOOL, Brussels (BE)

( * ) Notice: Subject to any disclaimer, the term of this patent is extended or adjusted under 35 U.S.C. 154(b) by 337 days.

(21) Appl. No.: 17/759,145

(22) PCT Filed: Jan. 19, 2021

(86) PCT No.: PCT/EP2021/051083
§ 371 (c)(1),
(2) Date: Jul. 20, 2022

(87) PCT Pub. No.: WO2021/148415
PCT Pub. Date: Jul. 29, 2021

(65) Prior Publication Data
US 2023/0038212 A1    Feb. 9, 2023

(30) Foreign Application Priority Data

Jan. 24, 2020 (EP) .................................. 20153693

(51) Int. Cl.
*H04B 17/00* (2015.01)
*H04B 17/10* (2015.01)
(Continued)

(52) U.S. Cl.
CPC ........ *H04B 17/104* (2015.01); *H04W 64/006* (2013.01); *H04W 74/002* (2013.01)

(58) Field of Classification Search
CPC .............. H04B 17/104; H04W 64/006; H04W 74/002; H04W 64/00; G01S 5/0009;
(Continued)

(56) References Cited

U.S. PATENT DOCUMENTS 6,028,551 A * 2/2000 Schoen ..................... G01S 5/06
342/357.56
6,285,318 B1 * 9/2001 Schoen ................. G01S 5/0226
342/357.56
(Continued)

OTHER PUBLICATIONS

International Search Report and Written Opinion of the International Searching Authority from the European Patent Office, in PCT/EP2021/051083 dated Apr. 1, 2021, which is an international application corresponding to this U.S. application.

*Primary Examiner* — Stephen M D Agosta
(74) *Attorney, Agent, or Firm* — Kolitch Romano Dascenzo Gates LLC

(57) ABSTRACT

Method of determining a position of a plurality of mobile network devices relative to a plurality of reference network devices, wherein the plurality of mobile network devices and the plurality of reference network devices communicate with one another over a wireless channel and access the wireless channel according to an access policy comprising a sequence of time frames, wherein each time frame of the sequence comprises a plurality of portions reserved for communicating messages relating to different time-of-flight (ToF) computation methods, each of the different ToF computation methods allowing for determining a position of at least one of the plurality of mobile network devices. A positioning system implements the above method.

12 Claims, 8 Drawing Sheets

(51) Int. Cl.
*H04W 64/00* (2009.01)
*H04W 74/00* (2009.01)

(58) Field of Classification Search
CPC ........ G01S 5/0018; G01S 5/0045; G01S 5/06; G01S 5/14; G01S 13/878; G01S 5/0205
See application file for complete search history.

(56) References Cited

U.S. PATENT DOCUMENTS

| | | | | |
|---|---|---|---|---|
| 9,794,753 | B1* | 10/2017 | Stitt | H04W 12/069 |
| 11,076,261 | B1* | 7/2021 | Meyer | H04W 76/14 |
| 2006/0232466 | A1* | 10/2006 | Park | G01S 19/48 |
| | | | | 342/357.4 |
| 2006/0240839 | A1* | 10/2006 | Chen | G01S 19/48 |
| | | | | 455/12.1 |
| 2007/0155489 | A1 | 7/2007 | Beckley et al. | |
| 2008/0104695 | A1* | 5/2008 | Fassino | G06F 21/6218 |
| | | | | 726/17 |
| 2009/0149202 | A1* | 6/2009 | Hill | G01S 5/0289 |
| | | | | 342/357.22 |
| 2009/0295631 | A1* | 12/2009 | Wu | G01S 19/21 |
| | | | | 342/357.48 |
| 2010/0141529 | A1* | 6/2010 | Allam | G01S 5/06 |
| | | | | 342/387 |
| 2011/0050501 | A1* | 3/2011 | Aljadeff | G01S 5/06 |
| | | | | 342/387 |
| 2013/0021206 | A1* | 1/2013 | Hach | G01S 5/02216 |
| | | | | 342/451 |
| 2014/0045522 | A1* | 2/2014 | Sugar | H04W 64/00 |
| | | | | 455/456.1 |
| 2014/0153546 | A1* | 6/2014 | Kim | H04W 48/18 |
| | | | | 370/332 |
| 2014/0241333 | A1* | 8/2014 | Kim | H04W 48/16 |
| | | | | 370/338 |
| 2016/0234704 | A1* | 8/2016 | Aldana | H04L 43/0864 |
| 2017/0126273 | A1* | 5/2017 | Shin | H04B 1/7075 |
| 2017/0197710 | A1* | 7/2017 | Ma | B64D 45/04 |
| 2017/0251449 | A1* | 8/2017 | Malik | H04W 64/003 |
| 2017/0269190 | A1* | 9/2017 | Henriksson | G01S 5/0242 |
| 2018/0003794 | A1* | 1/2018 | Raghupathy | G01S 5/0226 |
| 2018/0046861 | A1* | 2/2018 | Patel | G06T 19/006 |

\* cited by examiner

TIME-OF-FLIGHT BASED UNIFIED POSITIONING SYSTEM AND METHODS

TECHNICAL FIELD

The present disclosure is related to positioning and navigation systems, in particular indoor positioning and navigation systems, which determine position based on time-of-flight (ToF) of wireless messages between anchor nodes with known position and mobile nodes or tags with unknown position. The present disclosure is also related to a method of operating such positioning system, or to a method of determining a position through such a system.

INTRODUCTION

Indoor positioning and navigation systems (IPNS) are used to locate and track objects or people in real time and to navigate in unknown places, usually within a building or other contained area with no or poor GPS coverage. Traditionally, these systems comprise multiple fixed reference network devices, called anchor nodes, with known position, and mobile network devices, referred to as tags, with unknown position. Tags try to measure or estimate their distance or direction relative to the anchor nodes (or vice-versa). The position of the tags can then be calculated based on this information. Typical examples of IPNS include the tracking and location of assets and patients in healthcare, the tracking and location of pallets, packages and items in warehousing and logistics applications, monitoring of farm animals, etc. In the navigation domain, typical examples include a human or a robotic device navigating between two points in a building.

Most methods for determining position utilize the time-of-flight (ToF) of messages which are communicated wirelessly between the anchor nodes and the tags. Any kind of wireless communication technology can be used for determining position, also referred to as ranging, in particular wireless communication technologies based on radio frequency (RF) signals.

RF ranging techniques have significant effect on the localization accuracy and system complexity. Two of the most popular RF ranging techniques are received signal strength based (RSSI) ranging and time-based ranging, e.g., based on ultra-wide band (UWB) RF signals. UWB is a communication channel that spreads information out over a wide portion of the frequency spectrum. This allows UWB receiver to accurately timestamp the received packets. It is generally accepted that ranging based on RSSI is inaccurate in an indoor environment. In UWB time-based ranging the distance between a tag and an anchor node is obtained using measurements on the signal propagation delay or ToF. This can be accomplished using one-way ranging, also called Time-of-Arrival (ToA), two-way ranging (TWR), symmetrical double-sided two-way ranging (SDS-TWR), or time difference-of-arrival (TDoA).

The easiest techniques to implement are the TWR and the SDS-TWR. In these techniques, a short packet is sent back and forth between two nodes. Based on the timestamps, the round-trip time is measured, without a common time reference. The big advantage of this is that there is no need for clock synchronization amongst tags and anchor nodes. A drawback of this approach is that the tags need to have a transmitter for the two-way exchange of the messages and consume airtime to send these messages. As such, the number of tags in this approach will be limited to the available airtime.

In the TDoA technique, a tag broadcasts a packet and the anchor nodes measure the arrival time. Based on the differences in this arrival time, the position of the tag is estimated. For this technique, the clocks of the anchor nodes need to be synchronized, either through a wired connection or wirelessly. There is no need for the tag to be synchronized. There is an alternative way of implementing a TDoA system, in which signals are broadcasted from synchronized anchors using CDMA and the tag measures the TDoA between the signals (similar technique is used in GPS).

The last technique is based on (one-way) ToA. In this technique, the anchor nodes each send a packet, normally using a TDMA scheme, and the tag measures the ToF of each transmission. This technique is the most difficult to implement, as not only the anchors, but also the mobile tag needs to have a common time reference. However, one advantage is that the technique allows an unlimited number of tags to be used.

It is also known to combine two of the above ToF positioning techniques in order to increase localization accuracy. By way of example, WO 2013/043664 describes a hybrid positioning system based on TDoA and ToA. Based on TDoA information, an intermediate position of a tag is calculated. A final position of the tag is then calculated based on the intermediate position and iterative ToA computations. One disadvantage of this technique is that the tags need to comprise both a signal transmitter and a signal receiver.

SUMMARY

There is a need in the art to provide a ToF-based positioning system and related positioning method which overcomes the above drawbacks. In particular, it is an aim of the present disclosure to provide a ToF-based positioning method and system allowing to accept tags of different kinds, in particular accepting at the same time tags utilizing different ToF-based positioning techniques, e.g. tags using ToA and tags using TDoA. It is an aim of the present disclosure to provide ToF-based positioning methods and systems which are flexible in terms of the kinds of tags that can be utilized. It is an aim of the present disclosure to provide a ToF-based positioning method and system which allows for retro-fitting into existing systems, while allowing new kinds of tags to be used along with older ones, and therefore reduces costs.

According to a first aspect of the present disclosure, there is therefore provided a method of determining a position of a plurality of mobile network devices as set out in the appended claims.

Methods according to the present disclosure allow for determining a position of a plurality of mobile network devices relative to a plurality of reference network devices. The plurality of mobile network devices and the plurality of reference network devices communicate with one another over a wireless channel which is accessed according to an access policy comprising a sequence of time frames. Methods according to the present disclosure allow for concurrent positioning of tags operating according to different ToF modes or techniques. To this end, each time frame of the sequence comprises a plurality of portions, each portion being reserved for communicating messages relating to a different time-of-flight (ToF) computation method (relating to one of the above different ToF modes). Each of the different ToF computation methods advantageously allows for determining a position of at least one of the plurality of mobile network devices.

Hence, by dividing the time frame through which access to the wireless channel is (pre)determined in a plurality of portions, e.g. sub-frames, and reserving or allotting each portion to transmission of messages of a specific ToF mode (or computation method), it becomes possible to accept tags operating under these different ToF modes concurrently.

Advantageously, a first portion of the plurality of portions allows for accessing the wireless channel according to a time division multiple access (TDMA) scheme. Advantageously, a second portion of the plurality of portions allows for accessing the wireless channel according to a collision avoidance scheme.

Advantageously, the time frame can be arranged as a TDMA frame, in which first time slots are reserved/configured for the first portion as defined above and second time slots are reserved/configured for the second portion as defined above.

Advantageously at least two of the different ToF modes (or computation methods) are selected from the group consisting of: one-way Time of arrival, Time difference of arrival, Two-way ranging and Symmetrical double-sided two-way ranging. Advantageously, the different ToF modes (or computation methods) at least comprise one-way Time of arrival and Time difference of arrival.

According to a second aspect of the present disclosure, there is provided a positioning system as set out in the appended claims. The positioning system is advantageously configured to carry out the method according to the first aspect.

Positioning systems according to the present disclosure comprise a plurality of reference network devices and a network communication unit. The network communication unit is configured to establish a wireless communication channel using a channel access policy as set out in the methods as described herein. In particular, the channel access policy comprises a sequence of time frames, wherein each time frame of the sequence comprises a plurality of portions reserved for communicating messages relating to different time-of-flight (ToF) computation methods.

The positioning system can comprise a plurality of mobile network devices. Each of the different ToF computation methods advantageously allow for determining a position of at least one mobile network device of the plurality of mobile network devices.

BRIEF DESCRIPTION OF THE DRAWINGS

Aspects of the disclosure will now be described in more detail with reference to the appended drawings, wherein same reference numerals illustrate same features and wherein.

DETAILED DESCRIPTION

Definitions

Anchor node: a reference wireless network device with known position and used to determine the position of a mobile wireless network device. Each anchor node may send periodically navigation messages, including its own position, a timestamp and other control information. An anchor node may be, though need not be, positioned at a fixed location.

Master anchor node: anchor node whose clock will be used as a reference clock for the synchronization. All other anchor nodes will slave their clocks with the master clock. In a system, only one master anchor is allowed.

Slave anchor node: anchor node which is not a master anchor node. Slave anchor nodes will slave their clock to the master anchor node. Slave anchor nodes can be of different order of hierarchy, depending on how far the anchor node is from the master anchor:

Slave anchor node of order 1: All slave anchor nodes in the direct transmission range of the master anchor node.

Order 2 slave anchor node: All slave anchor nodes at strictly one hop from the master anchor. Order 2 slave anchor nodes are configured to synchronize indirectly on the master clock, via an order 1 slave anchor node.

Order x slave anchor node: All slave anchor nodes at strictly x-hops from the master anchor node.

Tag: a mobile wireless network device with (unknown) position that is to be determined.

Time-of-flight (ToF): the ToF of a message between any two network devices is the duration the message travels in the air between the transmit antenna and the receive antenna of these devices. The ToF generally does not include hardware delays in the devices.

Navigation (NAVG) message: Message sent over the wireless channel by an anchor node. This message can include the position of the anchor node, a timestamp of transmission and other control information.

Synchronization (SYNC) message: A type of navigation message that can be used for synchronization purposes.

Ranging (RANG) message: A type of navigation message that can be used for range measurement.

Blink (BLNK) message: A type of message sent by a tag when operating in TDoA mode.

Figure 1:
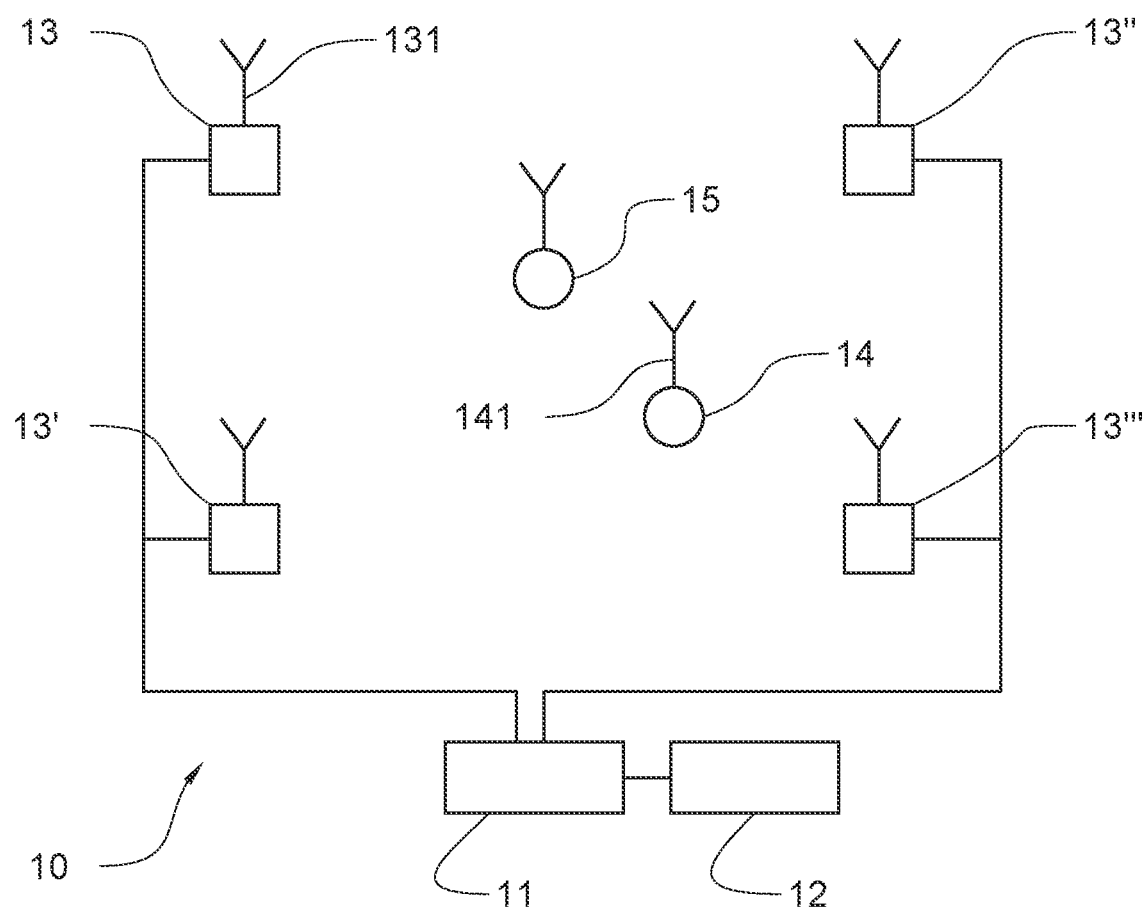
FIG. 1 represents schematically a positioning system according to aspects of the disclosure.

Referring to FIG. 1, a positioning system 10, which advantageously is an indoor positioning system and which may provide navigation features, comprises a wireless network controller 11 and a plurality of reference network devices 13, 13', 13", 13''' provided with respective antennas 131 enabling to transmit and/or receive messages wirelessly. In FIG. 1, the reference network devices 13-13''', hereinafter referred to as anchor nodes, are shown to be wire connected to the network controller 11, but this is not required. Wireless network controller 11 can be provided as a separate device, or can alternatively be integrated in one of the anchor nodes, e.g. anchor node 13, which may act as a master for controlling wireless communication through the network.

The network controller 11 is configured for implementing a wireless network. The wireless network can be configured for signal communication through any suitable technology, such as ultrasound, infra-red, vision-based, or radio frequency (RF), such as RFID, WLAN, Bluetooth, and ultra-wide band (UWB). Of these communication technologies, RF transmission, in particular UWB or WLAN, are preferred.

Figure 2:
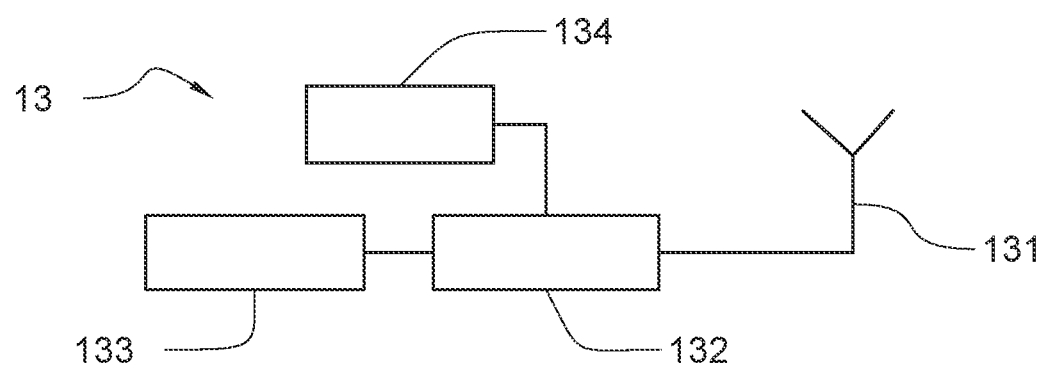
FIG. 2 represents schematically the components of a reference wireless network device.

Advantageously, the anchor nodes 13-13''' are configured to both send and receive messages through the wireless network. To this end, and referring to FIG. 2, each anchor node advantageously comprises a transmitter/receiver 132 connected to the antenna 131 and to a microprocessor 133. Each anchor node advantageously comprises an internal clock 134, which is connected to the transmitter/receiver 132 allowing to time stamp transmitted and/or received messages. The internal clocks 134 of all anchor nodes are advantageously synchronized by known means. By way of example, one anchor node 13 can act as a master for the clock, which is configured to send synchronization messages to the other anchor nodes 13'-13''' either via the wireless network, or an optional wired network, or through any other suitable means.

Positioning system 10 further advantageously comprises a position computation unit 12. Position computation unit 12 is configured to determine a position of mobile network devices 14, 15 based on time-of-flight (ToF) of messages that are communicated between the anchor nodes 13-13''' and the respective mobile network devices 14, 15. Position computation unit 12 can be provided as a centralized computation unit, or alternatively as a distributed unit, with smaller computation units distributed over the anchor nodes 13-13''' and/or the mobile network devices 14, 15.

Position computation unit 12 can store the positions of each of the anchor nodes 13-13'''. These positions can either be determined beforehand by known means, or be determined at regular intervals, in particular based on ToF of messages communicated between the anchor nodes through the wireless network.

Figure 3:
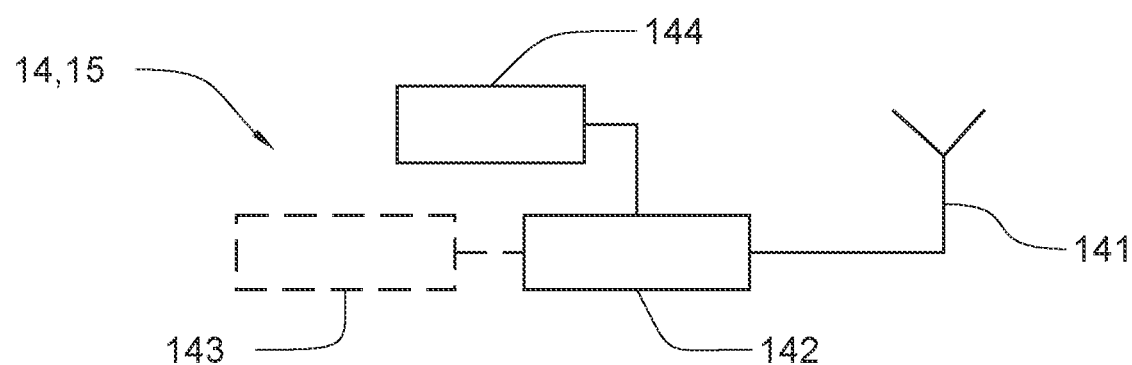
FIG. 3 represents schematically the components of a mobile wireless network device.

A plurality of mobile network devices 14, 15 can move around in an area covered by the wireless network. These mobile network devices 14, 15 will hereinafter be referred to as tags. Referring to FIG. 3, each tag 14, 15 comprises an antenna 141 and a transmitter and/or receiver unit 142. It will be convenient to note that, according to aspects of the disclosure, some tags, e.g. tag 14, are capable of both receiving and transmitting messages through the wireless network via antenna 141, and therefore unit 142 is a transmitter and receiver, while other tags, e.g. tag 15, are capable of only receiving messages from the wireless network via antenna 141, and therefore unit 142 will only be a receiver unit. Yet other tags may be capable of only transmitting messages through the wireless network via antenna 141. In this case, the unit 142 will only be a transmitter unit. According to aspects of the disclosure, as will be described further below, the positioning system 10 is capable of determining the position of these different types of tags.

The tags 14, 15 each have an internal clock 144 which is connected to receiver and/or transmitter unit 142 allowing to time stamp received and/or transmitted messages. Advantageously, for some ToF positioning techniques, the internal clocks 144 of the tags 14, 15 need not be synchronized with the clocks 134 of the anchor nodes, and need not be synchronized between different tags either. Alternatively, some or all tags are configured to synchronize their respective internal clocks 144 based on synchronization messages sent by one or more anchor nodes over the wireless network. Optionally, each tag 14, 15 comprises a microprocessor 143 coupled to the receive and/or transmit unit 142, which may be configured for generating messages, and/or performing ToF calculations for determining the position of the tag.

The anchor nodes 13-13''' can be mounted at fixed positions, e.g. in a building or other indoor or semi-indoor area. Alternatively, one or more of the anchor nodes can be mobile, which allows to dynamically change the coverage area of the wireless network, e.g. based on the positions of the mobile tags 14, 15.

Figure 4:
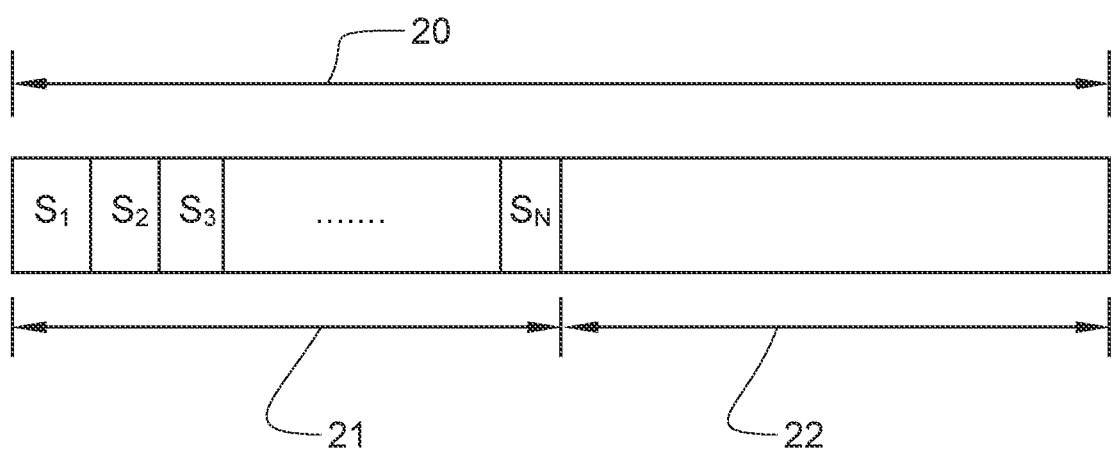
FIG. 4 represents the structure of a time frame according to an aspect of the present disclosure.

The wireless network controller 11 is configured to implement a channel access policy for sending messages over the wireless network. According to an aspect of the present disclosure, access to the wireless network (channel) is structured in a sequence of time frames, which advantageously have fixed length. Referring to FIG. 4, each time frame 20 is divided into a first part 21, a second part 22 and possible further parts (not shown in FIG. 4). Each part 21, 22 is reserved for communicating messages related to a specific ToF positioning technique, e.g. (one-way) ToA, TDoA, TWR, SDS-TWR, etc. By way of example, the first part 21 is (exclusively) reserved for ToA messages, while the second part 22 can be (exclusively) reserved for TDoA messages, and yet other parts can be (exclusively) reserved for TWR or SDS-TWR messages.

All time frames 20 of the sequence advantageously have predetermined, e.g. equal, time length. They advantageously have equal structure, e.g. a same order of occurrence/appearance of the different portions 21, 22. Corresponding portions between different time frames 20 can have predetermined, e.g. equal, time length. Alternatively, the structure of the time frames is adjustable, e.g. dynamic. This may be useful when the number of tags operating according to one or the other ToF positioning technique changes. In that case, it may be useful to enlarge one portion and reduce the other portion(s) within a time frame. The network controller 11 can be configured to control and adjust the time frame structure. A changed time frame structure may be communicated by the network controller 11 to the different tags 14, 15 through the wireless channel according to known techniques.

Each part 21, 22 is advantageously appropriately structured for communicating message types of the respective ToF positioning technique. By way of example, the first part 21 can implement a time-division multiple access (TDMA) method.

To this end, the first part 21 can be divided in time slots $S_1, S_2, S_3\text{-}S_N$. TDMA based mechanisms can be employed allowing only one anchor node and/or tag to transmit in a given time slot in a given contention area, optionally with spatial reuse of the slot outside the contention area. Advantageously, the time slots of the first part 21 are employed for a ToA mode of operation. In particular, each anchor node is allotted one (or more) time slot $S_1, S_2, S_3\text{-}S_N$ for sending its respective ToA message, which can refer to a navigation message. In alternative implementations, the first part 21 employs collision avoidance techniques (e.g., listen-before-talk, CSMA-like random medium access scheme, or a combination thereof) to transmit the ToA messages. In yet other implementations, the first part 21 is divided in time slots $S_1$, $S_2$, $S_3$-$S_N$ and more than one anchor node may transmit in a time slot using CDMA (code-division multiple access) or FDMA (frequency-division multiple access), or a combination thereof. Here CDMA is the preferred candidate. In the latter case, the receivers should be configured to receive multiple message transmissions in a given time slot.

Figure 5A:
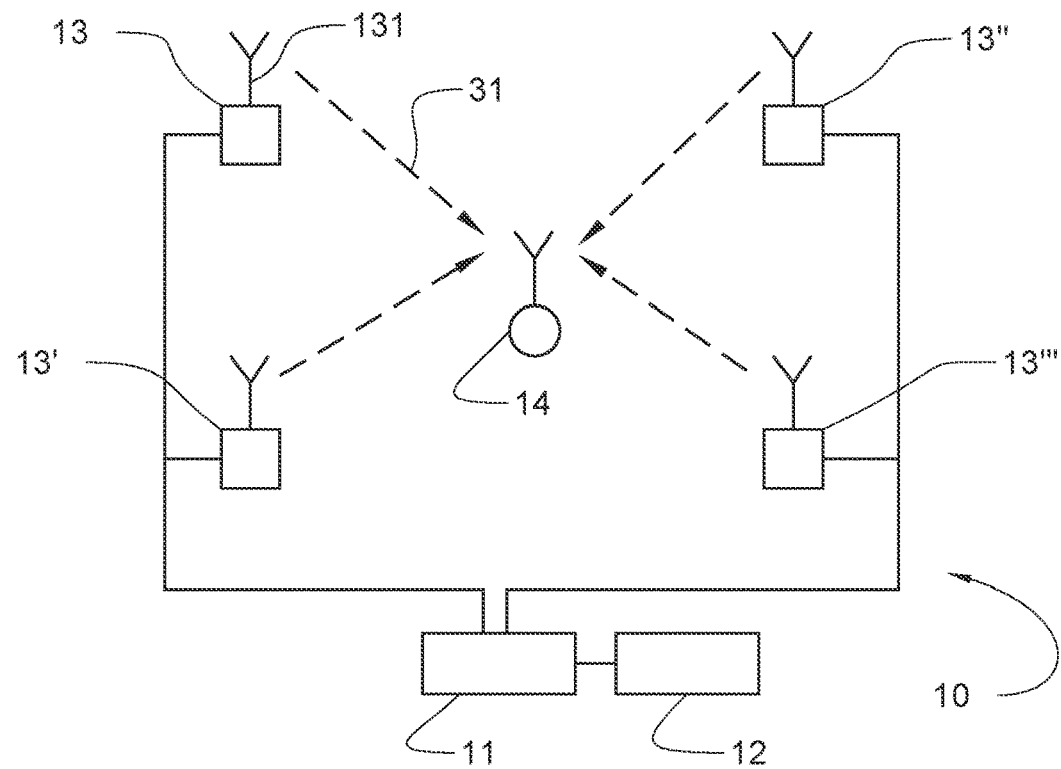
FIG. 5A represents a ToA mode of operation for the system of FIG. 1.

In the ToA mode of operation as illustrated in FIG. 5A, the anchor nodes each send one or more navigation messages 31. Tags 14 receive the navigation messages from different anchor nodes and timestamp the messages received. The tag's position is determined (locally, at tag level, or centrally at system level) based on the one-way ToF of the different received navigation messages. The ToA mode of operation is well suited for positioning and navigation applications where an object (e.g., drone) or a person is interested to know its own position, and wants to navigate from a given position to another position.

Figure 5B:
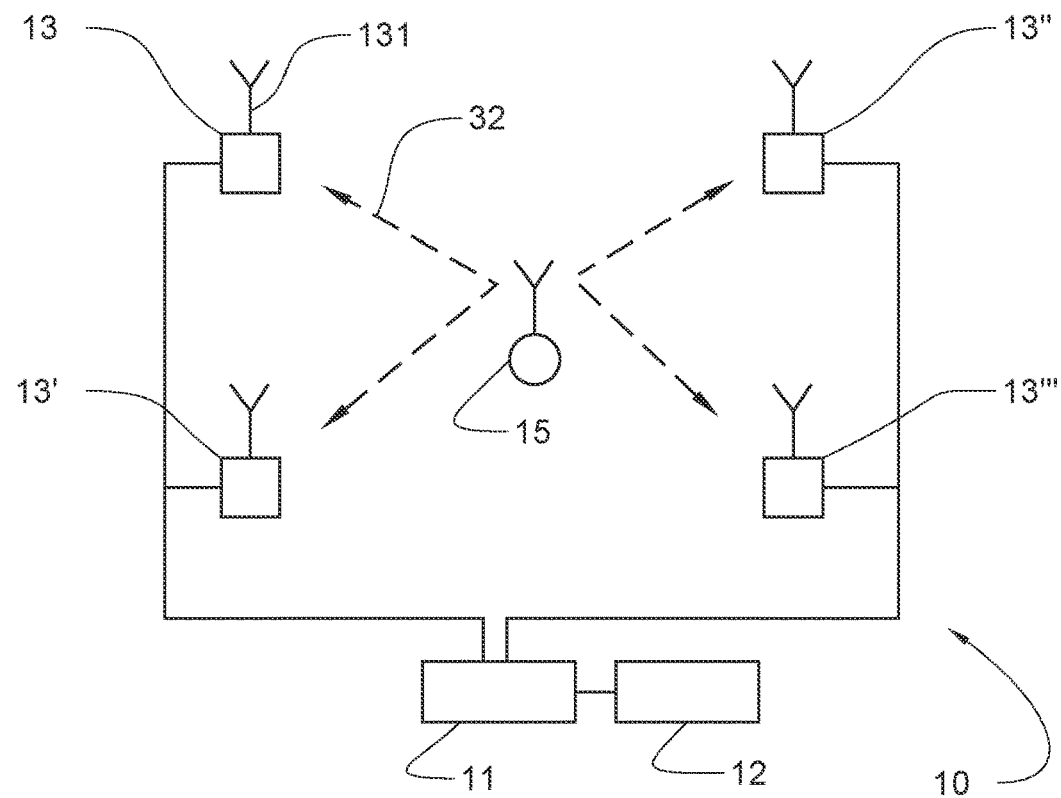
FIG. 5B represents a TDoA mode of operation for the system of FIG. 1.

In addition or alternatively, the second part 22 can be structured according to a collision avoidance method and is used for another ToF mode of operation. By way of example and referring to FIG. 5B, in the second part 22 the tags 15 are configured to transmit blink messages 32, which may be time-stamped. The blink messages 32 are then received by anchor nodes 13-13''' within reach of the tag. The blink messages are time-stamped when received by an anchor node and are then fed to the position computation unit 12 which can be configured to determine a position based on the different arrival times of a blink message at different anchor nodes, i.e. according to the TDoA positioning technique. It is alternatively possible to divide the second part 22 in time slots and assign each time slot to a tag for transmitting a blink message. Other techniques for transmitting such TDoA messages (blink messages) are possible as well.

The TDoA mode of operation can be suitable for asset (objects and people) tracking applications, where the network or the backend is interested to know the position of the asset at any given time. Recent technology trends, such as unmanned robotic devices, are spurring the growing of applications where there is need to support positioning and navigation for some of the objects and people, while at the same time support tracking of some other assets.

Hence dividing the time frame 20 in the first part 21 and the second part 22 allows for combining two or even more different ToF positioning methods in a same system. Advantageously, the time frames have equal time length. The first parts 21, second parts 22 and even further parts as the case may be advantageously have equal length throughout the plurality of time frames, i.e. all time frames are advantageously structured equally. Advantageously, at least one of the first part 21, second part 22 and further parts as the case may be is structured according to a TDMA method, and advantageously comprises a sequence of time slots of fixed/equal length $S_1$, $S_2$, $S_3$-$S_N$. The channel access policy in methods of the present disclosure are hence advantageously based on a TDMA principle as regards the structuring of the access time in time frames, and possibly the structuring of at least one of the first part, the second part and possibly further parts of the time frame. One may refer to the channel access policy described above as a hybrid TDMA based policy.

A tag can be configured either to use only one of the available ToF positioning methods (each ToF positioning method corresponds to a mode of operation of the system), or to combine different ToF positioning methods as appropriate. By way of example, when both ToA and TDoA modes of operation are available as described above, the tags implementing ToA will be able to self-position themselves, e.g. by employing internal microprocessor 143 for computing the tag's position, whereas the tags implementing TDoA may have their position calculated at the backend (centrally) through position computation unit 12. Some tags can be configured to operate in both modes ToA and TDoA, either simultaneously, e.g. in order to improve positioning accuracy, or depending on the situation, e.g. depending on the state or mode of operation of the tag, or on the position of the tag when e.g. the tag is allowed to move between areas of different criticality level, and these levels would require different positioning accuracy. In other words, the selection which of the available modes of operation to use may depend on the circumstances. Letting the backend calculate position through TDoA mode of operation, instead of sending the ToA calculated position from by the tag to the unit 12, would be more efficient, and more accurate. The backend usually has more computing resources and can afford to implement more sophisticated array of algorithms.

The time frame 20 may comprise yet further parts dedicated to communicating synchronization messages to/between the anchor nodes 13-13''', or even to the tags 14, 15 over the wireless network. It is alternatively possible to use the navigation messages transmitted by some anchor nodes during the first part 21 of the TDMA frame for synchronizing other anchor nodes according to known techniques. This can be convenient when the anchor nodes are structured in different hierarchy levels.

It will be convenient to note that the order and the duration of the first part 21, the second part 22 and possible further parts is not critical. It will be a design choice of the system.

Figure 6:
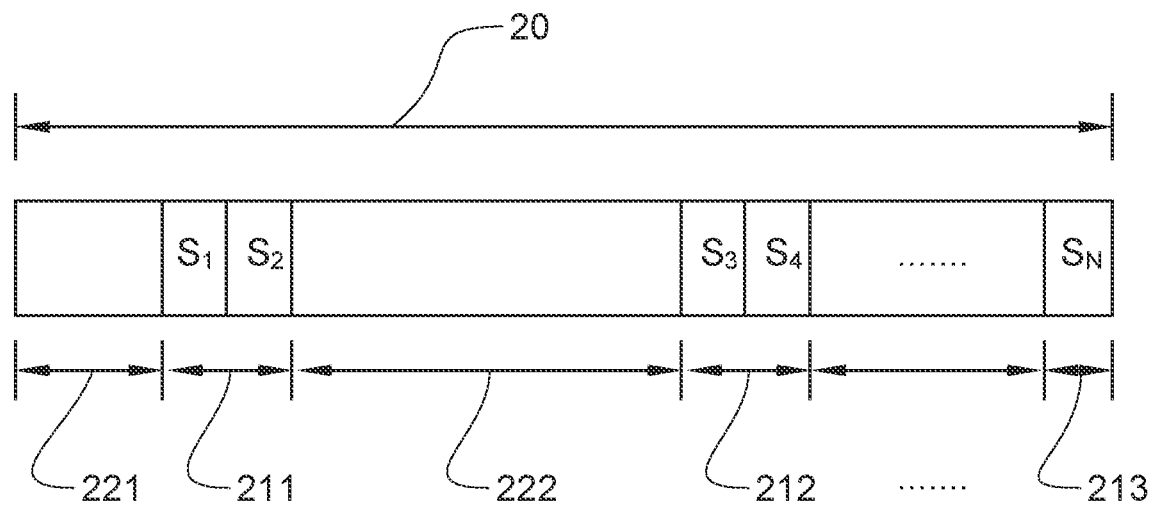
FIG. 6 represents an alternative structure of a time frame according to an aspect of the present disclosure.

Referring to FIG. 6, it is further possible to structure the time frame 20 such that the first part 21 and the second part 22 are divided in portions 211, 212, 213 and 221, 222 respectively. Portions 211, 212, 213, . . . of the first part 21 are interspersed with portions 221, 222, . . . of the second part 22. The number of portions and their ordering within the frame are not important.

Figure 7:
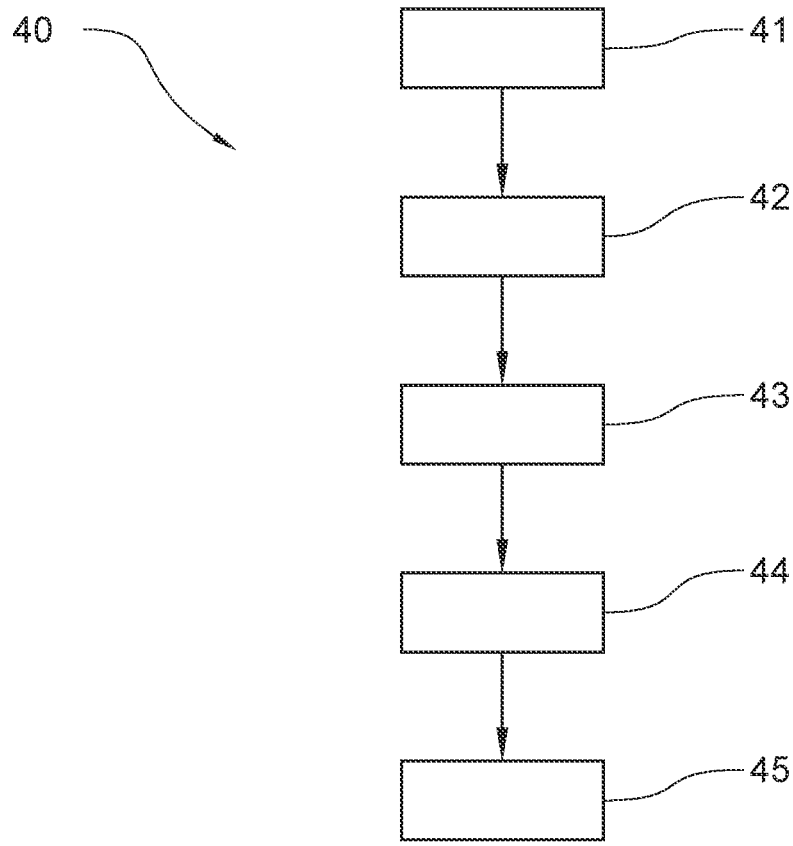
FIG. 7 represents a flow chart of a method according to aspects of the disclosure.

Referring to FIG. 7, a method 40 for operating the positioning system 10 according to aspects of the disclosure can comprise an initialization step 41 in which the different anchor nodes 13-13''' and possibly the tags 14, 15 receive the communication structure from wireless network controller 11. In particular, they can receive information relating to the time frame structure and possibly information relating to when each of the anchor node and each of the tag is allowed to transmit messages over the wireless network. The initialization step 41 can additionally, or alternatively comprise synchronization operations for synchronizing the anchor nodes and possibly the tags. This may include the anchor nodes and/or tags receiving synchronization parameters and receiving and/or sending synchronization messages. By way of example the master anchor node can transmit first synchronization messages allowing the $1^{st}$ order slave anchor nodes to synchronize their clocks 134 with the master clock. Subsequently, the $1^{st}$ order slave anchor nodes can transmit second synchronization messages allowing $2^{nd}$ order slave anchor nodes to synchronize their clocks, and so forth. One or more initialization operations of step 41 can be carried out at regular time intervals.

In step 42, messages are transmitted in the first parts 21 of the time frames 20 between the anchor nodes and the tags allowing to determine the position of at least some of the tags based on a first ToF positioning technique, e.g. ToA. By way of example, navigation messages are sent by the anchor nodes in time slots of the first part 21, which are received by the tags and allowing the position of the tags to be determined based on one-way ToA.

In step 43, the position of the tags which make use of the ToF positioning technique of step 42 is determined, e.g. centrally at the level of the position computation unit 12.

In step 44, messages are transmitted in the second parts 22 of the time frames 20 between the anchor nodes and the tags allowing to determine the position of at least some of the tags based on a second ToF positioning technique, e.g. TDoA. By way of example, blink messages are sent by the tags in the second parts 22 of the time frames and received by the anchor nodes and allowing the position of the tags to be determined based on TDoA.

In step 45, the position of the tags which make use of the ToF positioning technique of step 44 is determined, either locally (e.g. at the tag or an anchor node), or centrally.

It will be convenient to note that steps 42-45 need not be executed in the given order, but may be appropriately interspersed, e.g. steps 42 and 44 are executed first, followed by steps 43, 45. Furthermore, steps 43 and 45 need not be executed for each time frame 20, but can be performed once of each of a suitable number of time frames, e.g. two, three, four or even more consecutive time frames, to allow to collect all necessary ToF information from all anchor nodes and/or tags, in case such information cannot be gathered within a single time frame.

Figure 8:
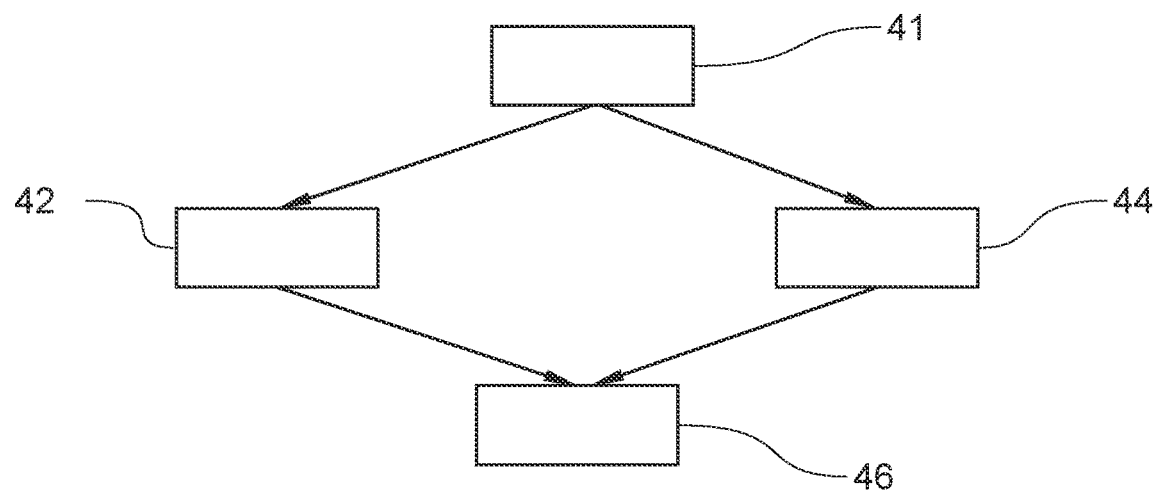
FIG. 8 represents a flow chart of an alternative method according to aspects of the disclosure.

Referring to FIG. 8, for the tags which implement both the first ToF positioning technique of step 42 and the second ToF positioning technique of step 44, it is alternatively possible to carry out steps 42 and 44 first, and to use ToF data gathered from both steps in a position calculation step 46.

It will be convenient to note that aspects of the present disclosure are not limited to any specific wireless communication technology. The underlying wireless technology could be sound-based, radio-frequency (RF) based, or light-based. Within each of these broader technology categories, there are numerous subcategories, and each of these can be applied in aspects of the present disclosure. In the RF domain, WLAN, Bluetooth, LoRa, LTE, and UWB are just a few examples.

ILLUSTRATIVE EXAMPLE

By way of illustration, referring again to FIG. 1, a positioning system combining TDoA and ToA modes of operation will now be described. For the system, it is assumed that the anchor nodes are synchronized and that, where required, tags can synchronize themselves based on the navigation messages sent by the anchor nodes over the wireless channel, which for the purposes of this example is an UWB channel. The anchor nodes can also use the navigation messages to synchronize their clocks.

In the system, anchor nodes will periodically send navigation messages comprising a transmit timestamp, the coordinates of their position and possibly any other suitable information. This periodically sending of navigation messages is done following a hybrid TDMA scheme according to aspects of the disclosure to avoid collisions of the messages.

The structure of the TDMA frame is divided into two parts as represented in FIG. 4. The first part 21, referred to as the self-positioning part (can also be called ToA or navigation part), consists of several timeslots $S_1, S_2, S_3$-$S_N$ that are used by the anchor nodes to send their NAVG messages. The assignment of a timeslot to an anchor node is done in such a way that collisions of navigation messages between anchor nodes are avoided. Tags, making use of the ToA service of the wireless network, will receive these navigation messages, timestamp their reception and calculate the distance to the respective anchor nodes based on the one-way ToF of these messages. When a tag can receive NAVG messages from a sufficient number of anchor nodes, it can calculate its own position. Alternatively, it is possible to perform the position calculation at the system level, in position computation unit 12.

The second part 22 of the TDMA frame, referred to as the network-centric part (or also TDoA or blink part) is reserved for the tags that use the TDoA service of the system. During this network-centric part of the TDMA frame, these tags send their blink messages. Anchor nodes in range of the tag, measure the arrival time of the blink message. Based on the differences in the arrival time at different anchors, the position of the tag can be calculated by the system. The tag might use some kind of collision avoidance mechanism, e.g., listen-before-talk for transmission of the blink message. In some implementations, the TDoA part can have slot and/or mini-slot structure, where the tags transmit their blink messages within slot/mini-slot boundaries.

Figure 9:
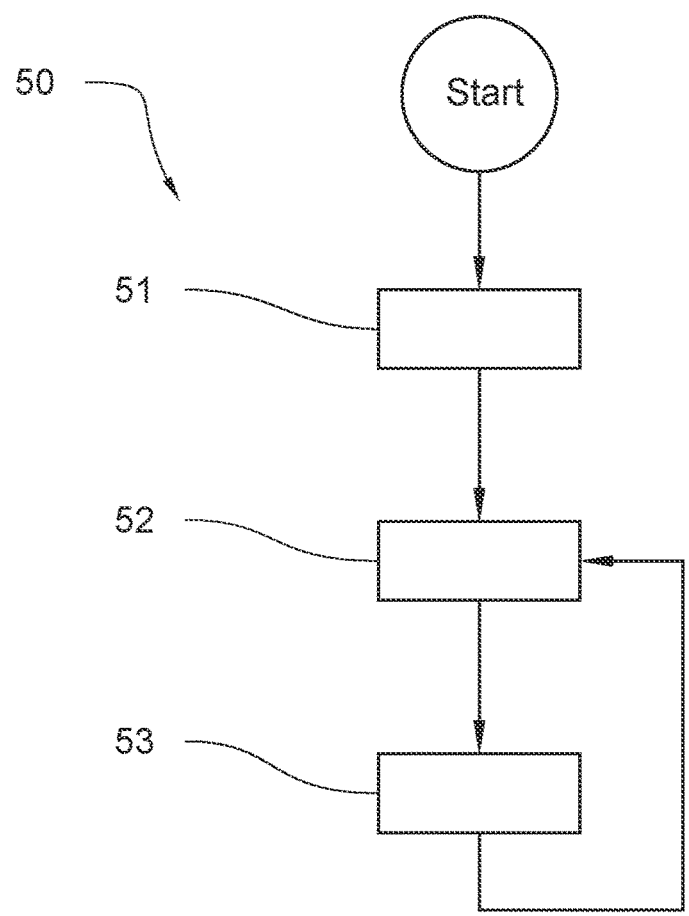
FIG. 9 represents a flow chart of the position determining operations of a reference wireless network device that can be used in methods of the disclosure.

In the above system, the anchor nodes can operate according to the scheme 50 of FIG. 9. In a first step 51, the anchor node is initialized. It receives—either through the same or another wireless channel or through wired connection—information relating to the TDMA frame structure used by the wireless network, and information relating to the slot assigned to it, and possibly further configuration information. Additionally, it receives synchronization messages allowing the anchor node to synchronize with the master clock.

The actual operation is carried out in steps 52 and 53. In step 52, the anchor node transmits a navigation message in the assigned slot of the first part 21 of the TDMA frame 20. In step 53, the anchor node acts as a receiver during the second part 22 of the TDMA frame and receives blink messages transmitted by the tags. Blink messages are time stamped by the anchor node. Steps 52 and 53 hence relate to the send and receive operations during one TDMA frame. In step 52 and/or 53, the anchor node can transmit the received blink messages to the position computation unit 12 for further processing along with any appropriate diagnostic data and other control information, either via the wireless channel or any other suitable means, e.g. wired communication network. This can be carried out at any suitable instant when the TDMA frame allows for transmission of such information. The frequency with which blink messages are transmitted to position computation unit 12 is not critical, e.g. each TDMA frame period or less.

Figure 10:
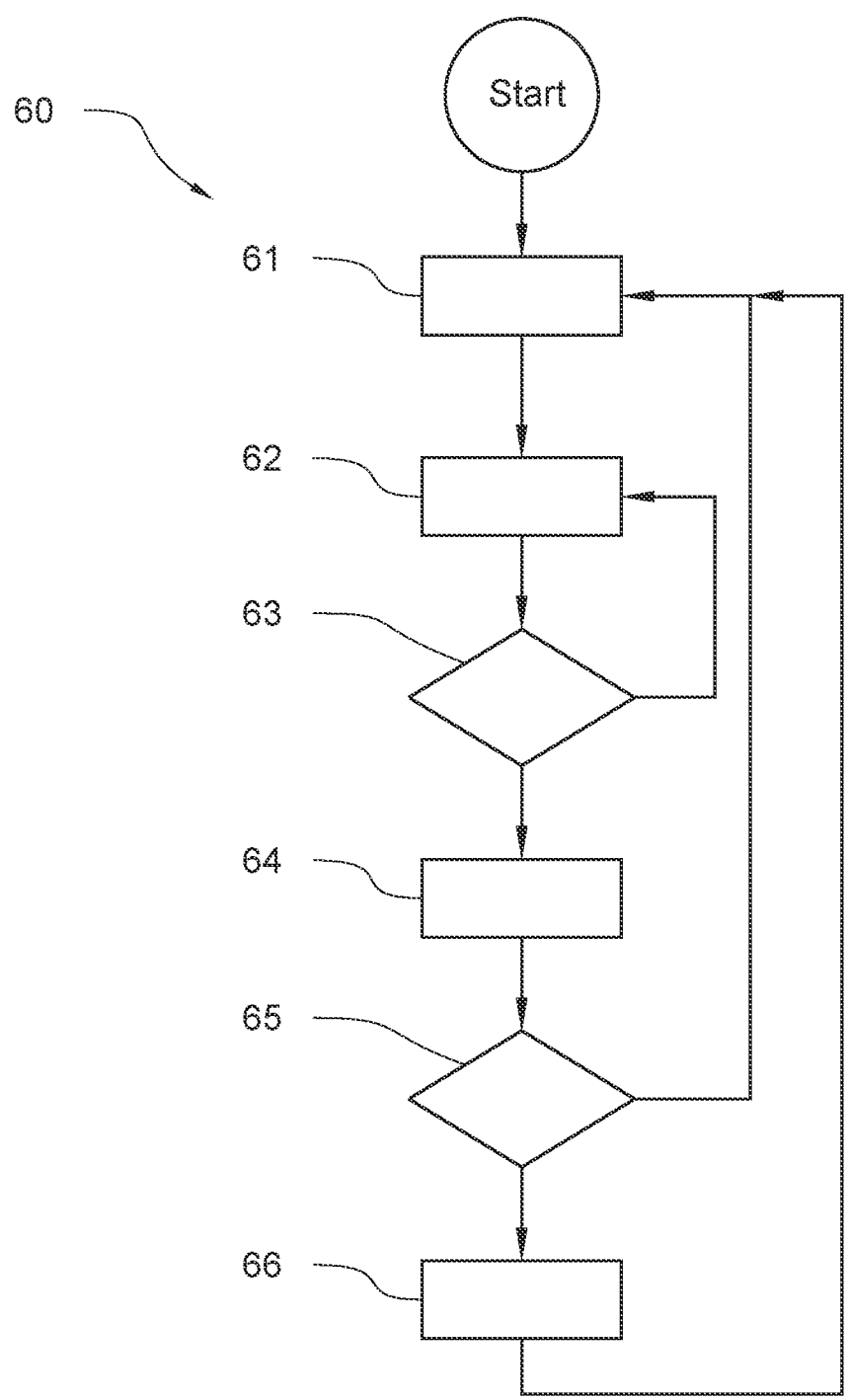
FIG. 10 represents a flow chart of the position determining operations of a mobile wireless network device utilizing exclusively a ToA positioning technique that can be used in methods of the disclosure.

The tags can operate according to a number of different positioning or navigation modes. Some tags operate exclusively according to a ToA positioning technique. The positioning method 60 of these tags is represented in FIG. 10. In a first step 61, the tag is initialized. In this step, the tag can receive the TDMA framing and synchronization information, e.g. through synchronization and/or navigation messages transmitted by one or more anchor nodes. The tag can update its time synchronization parameters based thereon. In step 62, the tag acts as a wireless receiver and receives navigation messages from the anchor nodes. The tag will wait until it has received a sufficient number of navigation messages allowing to reliably determine its position. This is checked in condition 63 for a given time period, e.g. an integer number of TDMA frame periods. If true, the tag, e.g. through microprocessor 143 can determine its position and update its positioning and/or navigation data in step 64. If false, i.e. an insufficient number of navigation messages have been received in the given time period, step 62 can be re-initiated. Some systems and some tags can allow for updating a user interface, or for transmitting the newly calculated position of the tag to a user port on the tag or to the system. This is checked in condition 65. If true, the new position data is output in step 66 and the method returns to step 61 or 62 as the case may be. If false, the method returns to step 61 or 62 as the case may be. It will be convenient to note that step 66 may require outputting data over the same wireless channel as used for the sending of navigation messages. In this case, the initialization step 61 can comprise discovering slots for transmission in the TDMA frame. In the step 62, the tag can also use some or all of the navigation messages for synchronizing its clock in addition, or in alternative to the synchronization in step 61.

Figure 11:
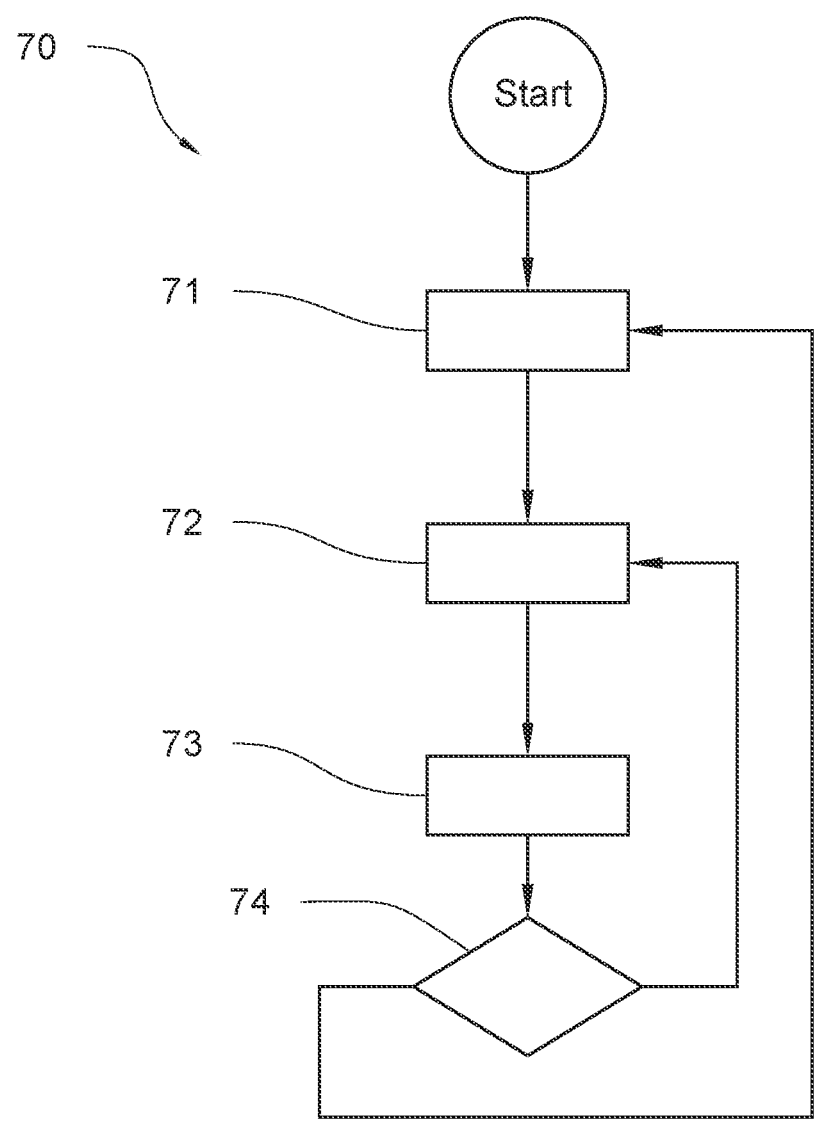
FIG. 11 represents a flow chart of the position determining operations of a mobile wireless network device utilizing exclusively a TDoA positioning technique that can be used in methods of the disclosure.

Other tags operate exclusively according to a TDoA positioning technique. The positioning method 70 of these tags is represented in FIG. 11. In a first step 71, the tag is initialized. In this step, the tag can receive the TDMA framing and synchronization information, e.g. through synchronization and/or navigation messages transmitted by one or more anchor nodes. The tag can update its time synchronization parameters based thereon. It will be convenient to note that the tag need not be synchronized for operating in TDoA mode. The step 71 can comprise discovering parts of the TDMA frame reserved for TDoA messages, such as e.g. the second part 22 of the TDMA frame. These parts can be discovered through messages transmitted by one or more anchor nodes, or any other suitable technique. A timer can be scheduled in accordance with the discovered TDMA frame structure. The transmitter of the tag can be configured for transmitting within the discovered parts according to the schedule of the (internal) timer.

Once initialization is complete, the method can move to step 72, in which the tag sends a blink message comprising tag identification information and possibly timestamp and other information. The blink message is advantageously sent within the discovered parts of the TDMA frame, according to the timer schedule. A clear channel assessment policy is advantageously used when sending the blink message. Any suitable clear channel assessment policy can be used, such as Carrier Sense Multiple Access (CSMA), listen-before-talk, etc. The clear channel assessment policy can be set by the wireless network controller 11 and communicated to the tag, as part of the initialization in step 71, or can be preconfigured.

In a TDoA positioning technique, the blink messages are received by the anchor nodes, are timestamped upon reception and forwarded to the position computation unit 12, which determines the position of the tag from the different arrival times of the blink message at a plurality of anchor nodes. The tag therefore can go to sleep in step 73. In condition 74, it is checked whether the timer has scheduled for transmission of a next blink message at the given time instant or whether an update is required. If the timer has scheduled for transmission of a next blink message, the method returns to step 72. If an update is required, the method returns to step 71. Other conditions may be tested as the case may be, e.g. error conditions.

Figure 12:
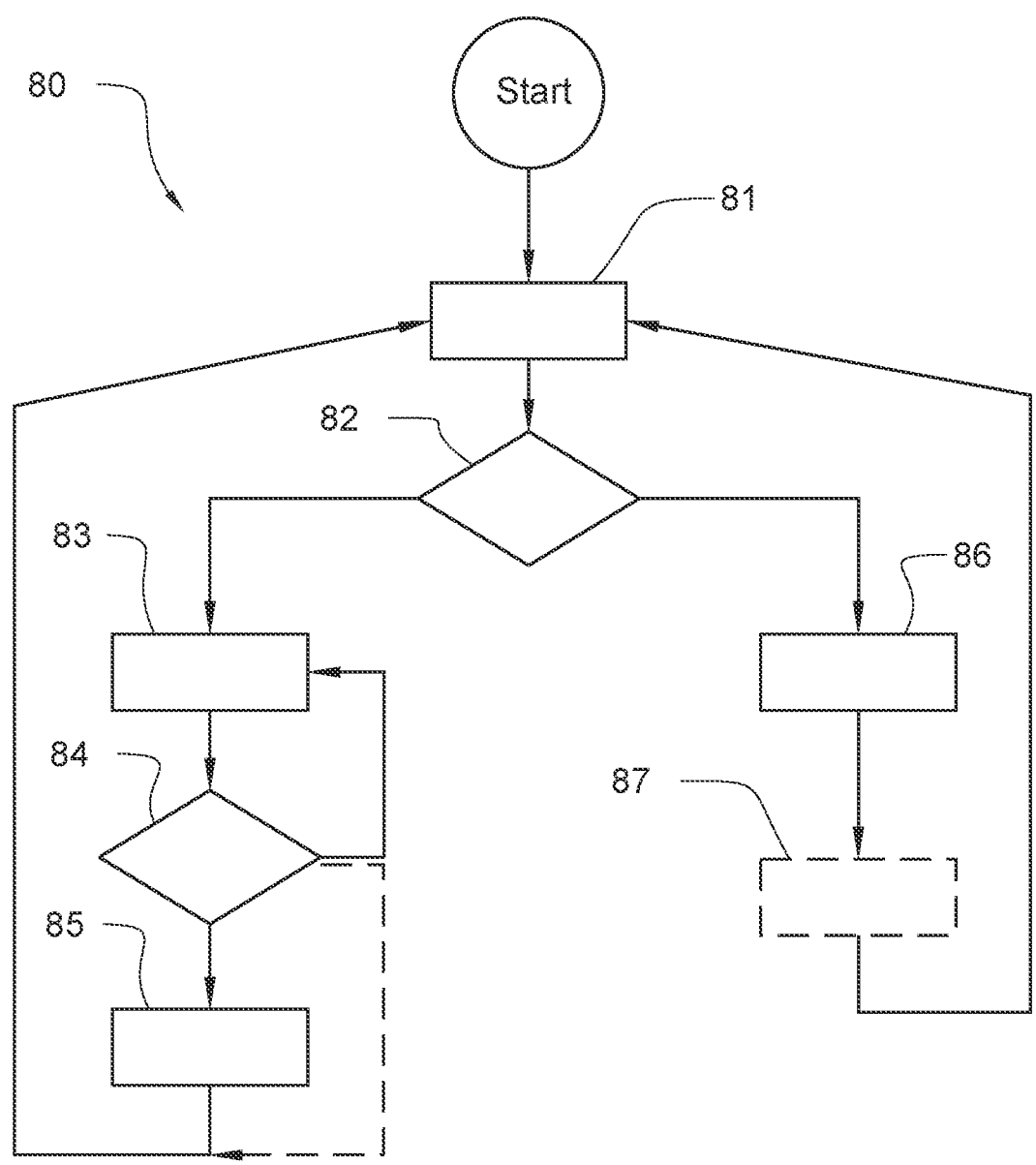
FIG. 12 represents a flow chart of the position determining operations of a mobile wireless network device utilizing a combination of a ToA positioning technique and a TDoA positioning technique that can be used in methods of the disclosure.

Yet other tags can operate both in ToA mode and TDoA mode. The positioning method 80 of these tags is represented in FIG. 12. Method 80 is advantageously a combination of ToA positioning method 60 and TDoA positioning method 70.

In a first step 81, the tag is initialized. In this step, the tag can receive the TDMA framing and synchronization information, e.g. through synchronization and/or navigation messages transmitted by one or more anchor nodes. The tag can synchronize its internal clock 144 based thereon. The step 81 can comprise discovering first parts of the TDMA frame for receiving ToA messages from the anchor nodes, such as e.g. the first part 21, and second parts of the TDMA frame reserved for sending TDoA messages, such as e.g. the second part 22 of the TDMA frame. These parts can be discovered through messages transmitted by one or more anchor nodes, or any other suitable technique. A timer for transmitting and for receiving can be scheduled in accordance with the discovered TDMA frame structure. The receiver of the tag can be configured for listening during the discovered first part(s) of and the transmitter of the tag can be configured for transmitting within the discovered second parts according to the schedule of the (internal) timer.

Once the tag is initialized, the tag can follow a specific order of steps to determine position first according to ToA, followed by position determination according to TDoA or vice versa. Alternatively, condition 82 can be provided, in which it is checked which part of the TDMA frame will be used first, e.g. by polling the timer schedule or based on any suitable policy.

In case the ToA part is first available, the method 80 moves to step 83, in which the tag acts as a wireless receiver in the scheduled period(s) of the TDMA frame, and receives navigation messages from the anchor nodes. The tag will wait until it has received a sufficient number of navigation messages allowing to reliably determine its position. This is checked in condition 84 for a given time period, e.g. an integer number of TDMA frame periods. If true, the tag, e.g. through microprocessor 143 can determine its position and update its positioning and/or navigation data in step 85. If false, i.e. an insufficient number of navigation messages have been received in the given time period, step 83 can be re-initiated, or if an error condition is set, e.g. because of a timeout, the method 80 may move back to step 81, condition 82, or directly to the TDoA part (step 86). Step 85 can further comprise for updating a user interface, or for transmitting the newly calculated position of the tag to a user port on the tag or to the backend of the system. Following step 85, the method returns to step 81. In the step 83, the tag can also use some or all of the navigation messages for synchronizing its clock.

Based on the timer schedule, condition 82 may move method 80 to step 86, where the TDoA operation starts. In step 86, the tag sends a blink message, comprising tag identification information and possibly timestamp and other information, within the second part(s) of the TDMA frame, according to the timer schedule. A clear channel assessment policy is advantageously used when sending the blink message. Any suitable clear channel assessment policy can be used, such as Carrier Sense Multiple Access (CSMA), listen-before-talk, etc. The clear channel assessment policy can be set by the wireless network controller 11 and communicated to the tag, as part of the initialization in step 81, or can be preconfigured.

In an optional step 87, the tag receives updated position information calculated by position computation unit 12 from the ToF information of the blink message. The tag can update its own positioning and/or navigation data with the new positioning information. It is possible to combine the positioning data obtained in step 85 and the one obtained in step 87 for improved accuracy. This can be performed either by the tag (e.g. microprocessor 143) or the backend (position computation unit 12). The method then returns to step 81.

The invention claimed is:

1. A method, comprising:
   determining a position of a plurality of mobile network devices relative to a plurality of reference network devices, wherein the plurality of mobile network devices and the plurality of reference network devices communicate with one another over a wireless channel and access the wireless channel according to an access policy comprising a sequence of time frames,
   wherein each time frame of the sequence comprises a plurality of portions reserved for communicating messages relating to different time-of-flight (ToF) computation methods, each of the different ToF computation methods allowing for determining a position of at least one of the plurality of mobile network devices;
   wherein at least two of the different ToF position computation methods are selected from the group consisting of: one-way Time of arrival, Time difference of arrival, Two-way ranging, and Symmetrical double-sided two-way ranging;
   wherein the time frames of the sequence or corresponding portions of the time frames of the sequence have predetermined time length;
   wherein in a first portion of the plurality of portions the wireless channel is accessed according to a time division multiple access scheme;
   wherein in a second portion of the plurality of portions the wireless channel is accessed according to a collision avoidance scheme; and
   wherein at least a portion of the plurality of reference network devices are arranged indoors;
   the method further comprising:
   communicating first messages between the plurality of reference network devices and a first mobile network device of the plurality of mobile network devices within a first portion of the plurality of portions, wherein the first messages relate to a first one of the different ToF position computation methods;
   collecting first ToF information from the first messages and determining a position of the first mobile network device based on the first ToF information by applying the first ToF position computation method:
   communicating second messages between the plurality of reference network devices and a second mobile network device of the plurality of mobile network devices within a second portion of the plurality of portions, wherein the second messages relate to a second one of the different ToF position computation methods; and
   collecting second ToF information from the second messages and determining a position of the second mobile network device based on the second ToF information by applying the second ToF position computation method.

2. The method of claim 1, wherein the first portion is exclusively reserved for communicating the first messages between the plurality of mobile network devices and the plurality of reference network devices, wherein the first ToF information allows to determine positions of at least a first portion of the plurality of mobile network devices using the first ToF position computation method.

3. The method of claim 1, wherein the second portion is exclusively reserved for communicating the second messages between the plurality of mobile network devices and the plurality of reference network devices, wherein the second ToF information allows to determine positions of at least a second portion of the plurality of mobile network devices using the second ToF position computation method.

4. The method of claim 1, wherein in the first portion of the plurality of portions, messages are transmitted exclusively by the plurality of reference network devices, wherein from the messages transmitted in the first portion one-way Time of arrival information is obtained.

5. The method of claim 1, wherein in the second portion of the plurality of portions, messages are transmitted exclusively by at least one of the plurality of mobile network devices, wherein from the messages transmitted in the second portion Time difference of arrival information is obtained.

6. The method of claim 1, wherein the portion of the plurality of reference network devices are in a fixed location relative to a building.

7. The method of claim 1, wherein the portion of the plurality of reference network devices are in a fixed location relative to a building or other fixed infrastructure.

8. A positioning system, comprising:
   a plurality of reference network devices and a network communication unit;
   wherein the network communication unit is configured to establish a wireless communication channel allowing for communicating with a plurality of mobile network devices using a channel access policy comprising a sequence of time frames; and
   wherein each time frame of the sequence comprises a plurality of portions reserved for communicating messages relating to different time-of-flight computation methods;
   wherein each of the different ToF computation methods allow for determining a position of at least one mobile network device of the plurality of mobile network devices;
   wherein the plurality of reference network devices are configured to communicate first messages with a first mobile network device of the plurality of mobile network devices within a first portion of the plurality of portions, wherein the first messages relate to a first one of the different ToF position computation methods, wherein the positioning system is configured to collect first ToF information from the first messages and determining a position of the first mobile network device based on the first ToF information by applying the first ToF position computation method, and
   wherein the plurality of reference network devices are configured to communicate second messages with a second mobile network device of the plurality of mobile network devices within a second portion of the plurality of portions, wherein the second messages relate to a second one of the different ToF position computation methods, wherein the positioning system is configured to collect second ToF information from the second messages and determining a position of the second mobile network device based on the second ToF information by applying the second ToF position computation method;
   wherein at least two of the different ToF position computation methods are selected from the group consisting of: one-way Time of arrival, Time difference of arrival, Two-way ranging, and Symmetrical double-sided two-way ranging;

wherein the time frames of the sequence or corresponding portions of the time frames of the sequence have predetermined time length;

wherein in the first portion of the plurality of portions the wireless channel is accessed according to a time division multiple access scheme;

wherein in the second portion of the plurality of portions the wireless channel is accessed according to a collision avoidance scheme; and wherein at least a portion of the plurality of reference network devices are arranged indoors.

9. The positioning system of claim 8, wherein each of the time frames comprises a first portion allotted to transmission of a first signal allowing to collect first ToF information allowing to determine a position using a first ToF position computation method, and a second portion allotted to transmission of a second signal allowing to collect second ToF information allowing to determine a position using a second ToF position computation method different from the first ToF position computation method.

10. The positioning system of claim 8, wherein the positioning system is configured to determine a position of the plurality of mobile network devices relative to the plurality of reference network devices, wherein the plurality of mobile network devices and the plurality of reference network devices communicate with one another over the wireless communication channel and access the wireless communication channel according to the channel access policy.

11. The positioning system of claim 8, wherein the portion of the plurality of reference network devices are in a fixed location relative to a building.

12. The positioning system of claim 8, wherein the portion of the plurality of reference network devices are in a fixed location relative to a building or other fixed infrastructure.

* * * * *